(12) United States Patent
Auclair (10) Patent No.: US 6,340,250 B1
(45) Date of Patent: Jan. 22, 2002

(54) FIBER OPTIC SHIELD CONNECTOR

(75) Inventor: William T. Auclair, Winsted, CT (US)

(73) Assignee: Electric Motion Company, Inc., Winsted, CT (US)

( * ) Notice: Subject to any disclaimer, the term of this patent is extended or adjusted under 35 U.S.C. 154(b) by 0 days.

(21) Appl. No.: 09/489,642

(22) Filed: Jan. 24, 2000

(51) Int. Cl.[7] .............................................. G02B 6/36
(52) U.S. Cl. ...................................................... 385/87
(58) Field of Search ............................. 385/87–90, 147

(56) References Cited

U.S. PATENT DOCUMENTS

| | | | | |
|---|---|---|---|---|
| 4,770,491 A | * | 9/1988 | Champa et al. ............... 174/79 |
| 5,872,879 A | * | 2/1999 | Hamm ........................... 385/25 |
| 5,949,929 A | * | 9/1999 | Hamm ........................... 385/25 |
| 6,160,217 A | * | 12/2000 | Auclair ......................... 174/51 |
| 6,173,103 B1 | * | 1/2001 | DeFrance ...................... 385/33 |

* cited by examiner

*Primary Examiner*—Akm E. Ullah
(74) *Attorney, Agent, or Firm*—Alix, Yale & Ristas, LLP (57) ABSTRACT

A fiber optic shield connector and enclosure are adapted to provide reliable, weather resistant ground connections to the conductive shield of a fiber optic cable. The connector comprises two steel clamp sections which form a rigid, conductive assembly surrounding the fiber optic cable. A plurality of sharpened, hollow grounding screws thread through the clamp sections to pierce the cable jacket and establish electrical contact with the cable shield. A gel-filled, two-part molded plastic enclosure surrounds the assembled cable and connector to provide protection from the environment.

14 Claims, 7 Drawing Sheets

FIBER OPTIC SHIELD CONNECTOR

BACKGROUND OF THE INVENTION

This invention relates generally to devices for implementing a ground connection between a metallic shield of a cable and a common ground point. More particularly, the present invention relates to clamp devices which mount to fiber optic cables and implement a ground connection via a flexible conductor.

Fiber optic cables are generally buried under ground and typically constructed in a tubular fashion with numerous fiber optic conductors surrounded by a conductive ground shield which is in turn surrounded by a protective jacket of tough flexible plastic or rubber. Many fiber optic cables also include steel cords running the length of the cable, positioned between the conductive shield and the protective jacket, which protect the fragile inner conductors and reinforce the cable. To function properly and safely, cable shields must be grounded at spaced ground points established by regulation and/or operational specifications and practices.

Cable shield ground clamp assemblies are ordinarily positioned within a cabinet, housing or other enclosure to provide a common ground point and shelter for the cables and attached grounding assemblies. Such enclosures are frequently located outdoors and/or underground, where the enclosures and their contents are subjected to intense environmental changes. It is not uncommon for the enclosure to be exposed to moisture in the form of rain, ground water or condensation. Temperature swings from well below freezing to above 100° F. are not uncommon.

Establishing reliable electrical connections between the conductive shield of fiber optic cables and a common ground point presents difficulties well known in the art. Conventionally, craft personnel must cut through the protective jacket and expose the metallic shield prior to affixing any clamp or other device for establishing a ground path. Any such cutting or piercing of the protective shield by craft personnel makes the fiber optic conductors and linear strength members susceptible to being damaged, weakened or cut with the potential for delays and costly repairs. Costs are further increased by the specialized training and equipment required to prepare craft personnel to perform the task of cutting the cable shield.

SUMMARY OF THE INVENTION

Briefly stated, the invention in a preferred form is a fiber optic shield connector for establishing a reliable ground path from the conductive shield of a fiber optic cable to a common ground point via a flexible conductor. A preferred form of the fiber optic shield connector includes cooperative clamp sections, each composed of electrically conductive, structurally rigid material. Each clamp section includes an open-ended trough defining a longitudinal channel with open, semicircular ends. Linear flanges integrally extend transversely from the trough and contain structures for receiving hardware which joins the two clamp pieces together in a conductive, rigid structure surrounding an open-ended receiving cavity. The structure forming the trough of each clamp section has several threaded openings for receiving grounding screws. Grounding screws threadably engage the threaded openings and penetrate through the clamp material, projecting into the receiving cavity formed by the clamp. Each grounding screw is provided with a sharpened cutting tip surrounding a deep axial recess in the center of the screw.

The clamp is assembled around a fiber optic cable, forming a conductive rigid enclosure with the cable traversing therethrough. The grounding screws are then tightened, penetrating the cable jacket and contacting the conductive shield. The cutting tips penetrate the jacket by cutting a small core of jacket material which is allowed to pass into the deep axial recess of each grounding screw. Several grounding screws are angularly and longitudinally positioned in each clamp section to increase the number and quality of ground contacts with the cable shield. A flexible ground lead is affixed to the clamp and connected to the common ground point.

In another embodiment of the invention, the assembly including the fiber optic cable, shield connector and ground lead is then placed within a molded two piece enclosure. The enclosure includes a box-like tub and mating box-like cover, each surrounding a substantially rectangular interior space with rounded bifurcated notches disposed in the end walls of both the cover and the tub. The notches are aligned so the assembled enclosure has a longitudinal opening which allows the cable to pass through the enclosure. The tub and cover interior spaces may be partially filled with water repellant gel. A durable waterproof enclosure surrounding the ground connection is formed by the mated cover and tub.

An object of the invention is to provide a new and improved connector for establishing and maintaining a high quality ground connection with a fiber optic cable shield.

Another object of the invention is to provide a new and improved fiber optic shield connector which does not require opening of the cable shield prior to installation of the connector.

A further object of the invention is to provide a new and improved fiber optic shield connector that minimizes damage to the fiber optic cable jacket while establishing reliable grounding of the fiber optic cable shield.

A yet further object of the invention is to provide a new and improved fiber optic shield connector which reduces labor costs and craft error.

A yet further object of the invention is to provide a new and improved fiber optic shield connector assembly having improved water, weather and environmental resisting capabilities.

Other objects and advantages of the invention will become apparent from the specification and the drawings.

DETAILED DESCRIPTION OF THE PREFERRED EMBODIMENT

With reference to the drawings wherein like numerals represent like parts throughout the Figures, a fiber optic shield connector in accordance with the present invention is generally designated by the numeral 10. Fiber optic shield connector 10 is particularly adapted for establishing a reliable ground connection with the conductive shield of a fiber optic cable 40 without a significant disruption of the cable jacket 46.

Figures 1, 2, 3, 4:
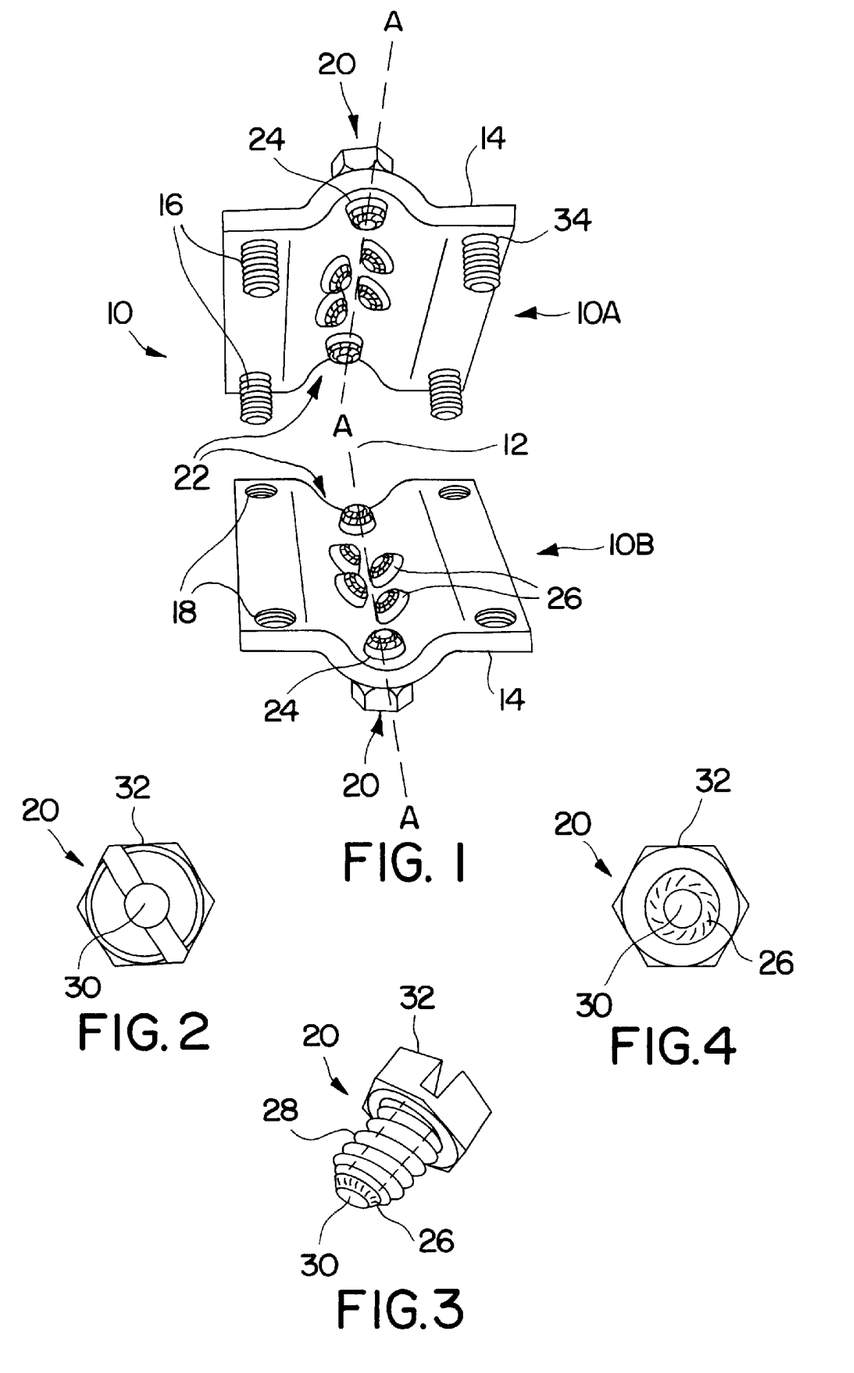
FIG. 1 is a partially exploded perspective view of a fiber optic shield connector in accordance with the present invention.
FIG. 2 is a top view of a grounding screw of the connector of FIG. 1.
FIG. 3 is a perspective side view of the grounding screw of FIG. 2.
FIG. 4 is a bottom view of the grounding screw of FIG. 2.

A preferred embodiment of the connector, illustrated by FIG. 1, includes two substantially similarly shaped clamp sections, designated 10A and 10B. Each section is preferably constructed from cold rolled steel or similar structurally rigid conductive material. Each section, 10A, 10B includes a central trough 22 defining a longitudinal channel with open semicircular ends. Linear flanges 14 transversely integrally extend from the longitudinal edges on each side of the central trough 22. The linear flanges 14 include attachment points for fasteners which will attach the two sections into a rigid conductive assembly. Upper section 10A has unthreaded holes 34 for receiving fasteners 16. Lower section 10B has corresponding threaded holes 18 to engage the fasteners 16 and facilitate assembly of the connector into a rigid clamp.

Referring now to FIGS. 2–4, a grounding screw 20 according to the present invention has a radially enlarged driving head 32, a threaded shaft 28 integrally projecting from the head 32 and a sharpened cutting tip 26, which surrounds a deep axial recess 30 in the shank 28. In a preferred embodiment, the axial recess 30 passes entirely through the length of the shank 28 and head 32 of the screw 20. The sharpened cutting tip 26 surrounds the axial recess 30 of the grounding screw 20. In a preferred embodiment, the cutting tip 26 may be serrated to aid in penetrating the jacket 46 and removing any coating on the shield 44 which may interfere with electrical contact.

The trough of each clamp section has a longitudinal central axis A and defines a plurality of threaded openings 24, which receive the threaded shanks 28 of the grounding screws 20. In a preferred embodiment there are six openings 24 in the trough portion of each section. As best seen in FIG. 1, two of the openings 24 are placed in the arcuate middle of the central trough 22 so that the cutting tips 26 of grounding screws 20 received therein are aligned with and oriented toward the central axis A. Four openings 24 are placed in the arcuate walls of the central trough 22, two on each side in a staggered angular relationship, so that the cutting tips 26 of grounding screws 20 received therein are oriented at corresponding angled relationships to the central axis A. The number and arrangement of grounding screws creates multiple opportunities to contact the cable shield from several angles on each side of the cable.

The length of each grounding screw 20 is selected so that the shank 28 of the grounding screw will penetrate the section 10A, 10B and protrude a pre-determined distance into the receiving cavity 12 defined by the assembled connector. The cutting tip 26 of the grounding screw 20 is prevented from penetrating further by the radially enlarged head 32 contacting the exterior surface 36 of the half shell 10A, 10B.

Figure 5:
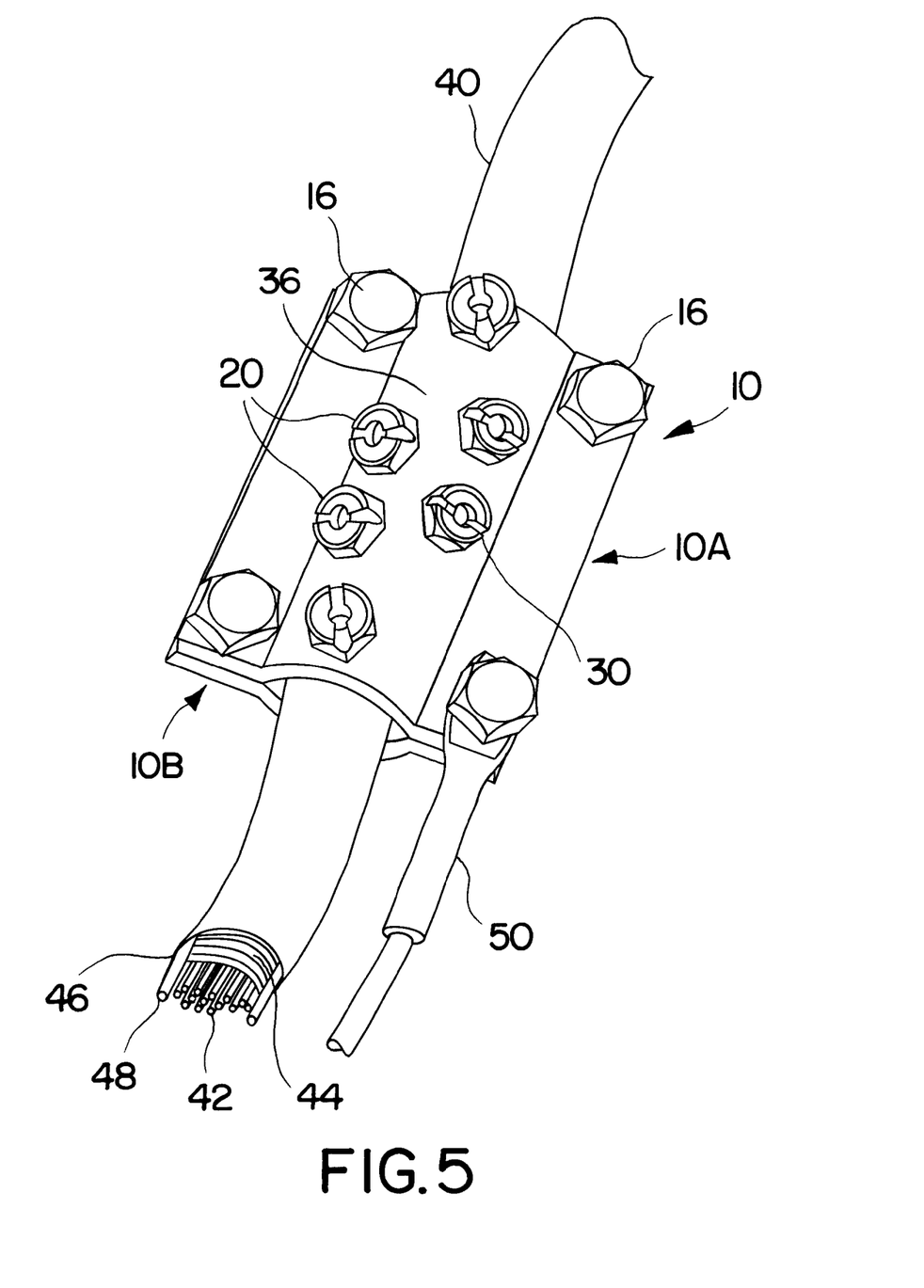
FIG. 5 is a perspective view of the fiber optic shield connector of FIG. 1 installed on a fiber optic cable (partially illustrated) with a ground lead (partially illustrated) in accordance with an aspect of the present invention.

FIG. 5 illustrates the fiber optic connector 10 in an installed configuration surrounding a fiber optic cable 40 (partially illustrated) and provided with a ground lead 50 (partially illustrated). The fiber optic cable 40 has a conventional structure which includes fiber optic conductors 42, a conductive shield 44, linear strength members 48 and a protective jacket 46. Lower section 10B is illustrated in an installed position beneath the fiber optic cable 40 with the cable aligned with and partially received in the central trough 22. Upper section 10A is illustrated in an installed position over the fiber optic cable 40 with the cable aligned with the central trough 22. The linear flanges 14 are mated with each other in a surface-to-surface relationship and held in place by fasteners 16, thereby forming a rigid conductive assembly surrounding and clamped to the fiber optic cable 40.

With reference to FIG. 5, the grounding screws 20 have been tightened so that the cutting tips 26 of the grounding screws 20 protrude into the receiving cavity 12 occupied by the fiber optic cable 40. In doing so, the cutting edges 26 of the grounding screws 20 cut into the protective jacket 46 of the fiber optic cable 40. As each grounding screw 20 penetrates the protective jacket 46, a core of jacket material is formed within the longitudinal recess 30 of the shank 28 of the grounding screw 20. The longitudinal recess 30 allows jacket material to migrate into the recess 30, while the serrated, angled cutting tips 26 displace jacket material to the sides. The unique construction of the grounding screw 20, with its longitudinal recess 30 and serrated angled cutting tip 26, efficiently penetrates the thick tough jacket material to establish superior electrical contact with the cable shield 44.

When fully tightened, the head 32 of each grounding screw contacts the outside surface 36 of the connector and the cutting edge 26 of the grounding screw 20 contacts the conductive shield 44 of the fiber optic cable 40 establishing a conductive path from the shield 44 to the connector clamp sections 10A, 10B. The grounding screws 20 cannot be overtightened because the head 32 bottoms out against the outside surface 36 of the connector sections 10A, 10B preventing further penetration. In a preferred embodiment the grounding screws 20 also secure and ground the linear strength members 48.

Thus, a fiber optic shield connector according to the present invention can establish a reliable multi-point ground connection with the conductive shield of a fiber optic cable while leaving the cable jacket largely intact. No special tools or skills are required to affect a ground connection using the inventive fiber optic shield connector 10. A ground lead 50 (partially illustrated) may be attached using the clamp fasteners 16. The flexible conductor of the ground lead 50 may then be positioned and attached to a common ground point. The length of the lead 50 may be varied, allowing maximum flexibility in positioning the cable 40 within any enclosure (not illustrated).

A molded fiber optic shield connector enclosure according to one aspect of the present invention is illustrated in FIGS. 6–13. The enclosure includes a box-like nonconductive molded tub 80 and a mating box-like nonconductive molded cover 60. The enclosure cover 60 includes a closed top 63 and opposed side walls 62 and end walls 64 which integrally project from the closed top. Inner end walls 66, integrally project from the closed top 63 toward the open bottom of the cover. Each wall terminates in an edge which together define the open bottom of the cover 60. The outer end walls terminate in outer end wall edges 68; inner end walls 66 terminate in inner end wall edges 70; and side walls 62 terminate in side wall edges 72. The medial portions of the inner and outer end wall edges 68, 70 define identical rounded notches projecting toward the closed top 63 of the cover 60. The notches 74 are bifurcated, having a first width at their respective edges 68, 70 and narrowing to a second width as the notch 74 approaches the closed top 63 of the cover 60. The dual width of the rounded notches 74 allows the cable shield connector enclosure to effectively accommodate fiber optic cables of various diameters.

Figure 6:
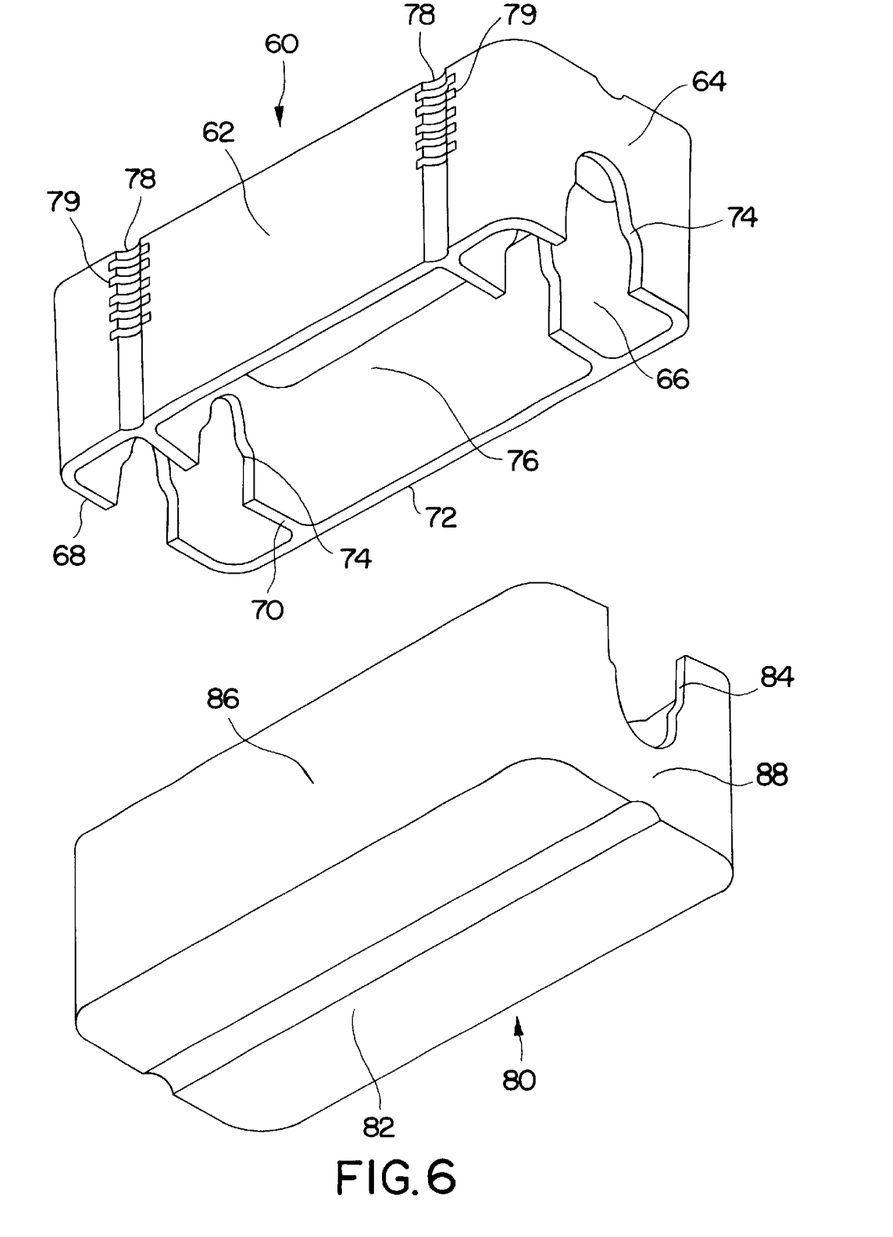
FIG. 6 is a partially exploded perspective view of a fiber optic shield connector enclosure in accordance with an aspect of the present invention as seen from below.
Figure 7:
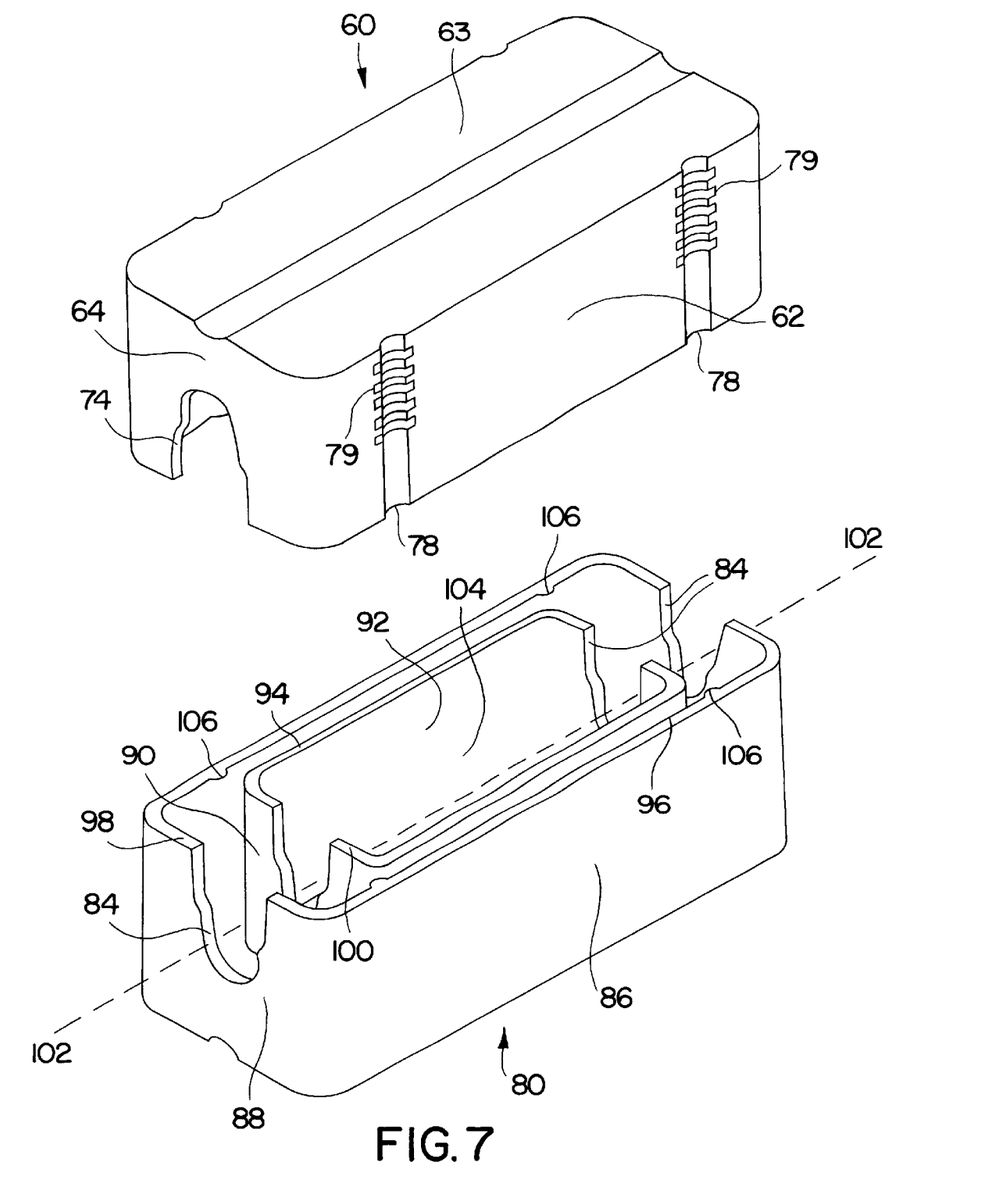
FIG. 7 is a partially exploded perspective view of the fiber optic shield connector enclosure of FIG. 6 as seen from above.

The side walls 62 of the enclosure cover 60 define outward facing rounded grooves 78 configured to mate with corresponding inward facing rounded protrusions 106 in the outer side walls 86 of the cable shield connector enclosure tub 80.

The enclosure tub 80 is a rectangular molded unit having a closed bottom 82 and an open top. FIG. 7 illustrates the configuration of the outer side walls 86, inner side walls 92, outer end walls 88 and inner end walls 90 integrally projecting from the closed bottom 82. Each wall terminates in an edge, which together define the open top of the tub. The outer side walls terminate in outer side wall edges 96; the inner side walls terminate in inner side wall edges 94; the outer end walls terminate in outer end wall edges 98; and the inner end walls terminate in inner end wall edges 100. Inner side walls 92 and end walls 90 form a cradle and define a central space 104. Identical rounded notches 84 are disposed in the inner end walls 90 and outer end walls 88. The tub notches 84 are substantially identical in configuration to the cover notches 74 and are positioned in the tub end walls 88, 90 to align with the cover notches 74, to form an unobstructed longitudinal opening 102 traversing completely through the assembled enclosure.

The enclosure tub 80 and cover 60 are configured so that cover outer side 62 and end 64 walls fit closely within tub outer side 86 and end 88 walls. Cover 60 side walls 62 fit between tub inner 92 and outer 86 side walls and cover inner end walls 66 fit closely outside tub inner end walls 90. Cover 60 and tub 80 fit together in a press fit with cover 60 rounded grooves 78 aligned and mating with tub 80 rounded protrusions 106. As the cover 60 is pushed within the tub 80 the tub rounded protrusions 106 engage transverse detents 79 provided in cover 60 rounded grooves 78, thereby retaining the cover 60 in mated position with the tub 80. The cover 60 and tub 80 are sufficiently flexible that the protrusions 106 displace from one detent 79 to another, snapping into place and holding the enclosure together. Several transverse detents 79 are provided to allow the cover 60 and tub 80 to be held in a range of stable mated positions.

Figure 8:
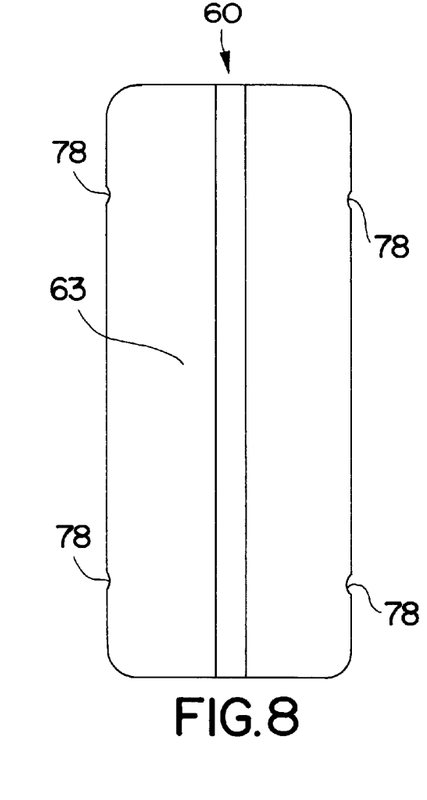
FIG. 8 is a top plan view of the cover of the fiber optic cable shield connector enclosure of FIG. 6 as seen from above.
Figure 9:
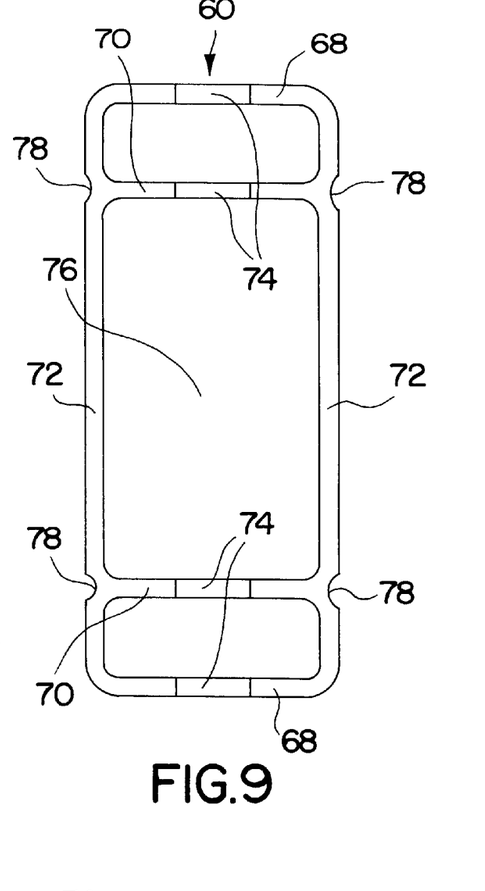
FIG. 9 is a bottom plan view of the fiber optic shield connector cover of FIG. 8.

FIGS. 8 and 9 show a top and bottom view, respectively, of an enclosure cover 60. A rectangular central space 76 is defined by side wall edges 72 and inner end wall edges 70. Aligned rounded notches 74 in the medial portions of the inner 70 and outer 68 end wall edges form an unobstructed path allowing the cable 40 to pass entirely through the assembled enclosure. The positioning and configuration of the rounded mating grooves 78 can be clearly seen in FIGS. 8 and 9.

Figure 10:
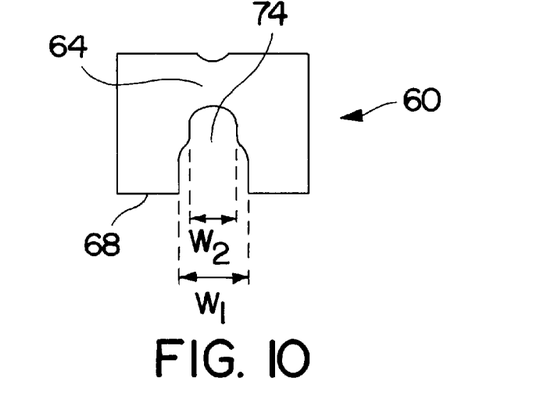
FIG. 10 is an end view, partly in schematic, of the fiber optic shield connector cover of FIG. 8.

FIG. 10 illustrates an end view of the enclosure cover. Rounded notches 74 in the inner 66 and outer 64 end walls are bifurcated, having a first width $W_1$ at their respective wall edge 68, 70 and tapering to a second width $W_2$ as the notch 74 approaches the closed top 63 of the cover 60.

Figure 11:
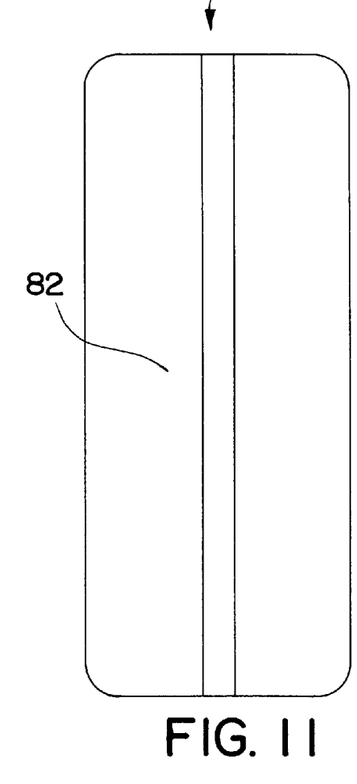
FIG. 11 is a bottom view of the tub of the fiber optic cable shield connector enclosure of FIG. 6.
Figure 12:
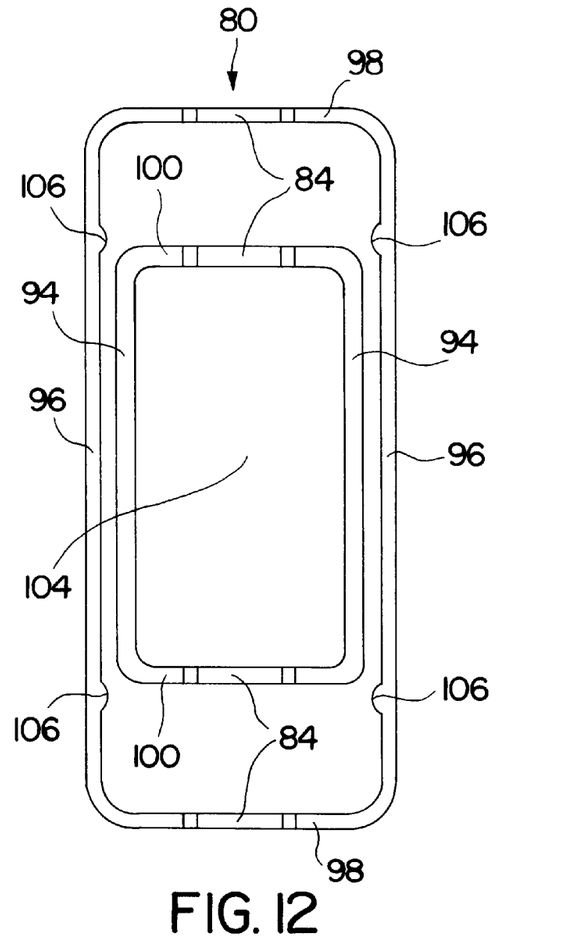
FIG. 12 is a top plan view of the fiber optic cable shield connector tub of FIG. 11.

FIGS. 11 and 12 illustrate bottom and top views of the fiber optic shield connector enclosure tub 80. Inner side 94 and end 100 walls form a cradle defining a rectangular central space 104 and are surrounded by opposed outer side 96 and end 98 walls in spaced relationship to form the double rectangular wall of the enclosure tub 80. Side wall 86 rounded protrusions 106 are similar in shape to cover rounded grooves 78 and are positioned to engage the rounded grooves 78 when the tub 80 and cover 60 are in mating position (as illustrated in FIGS. 6, 7 and 14).

Figure 13:
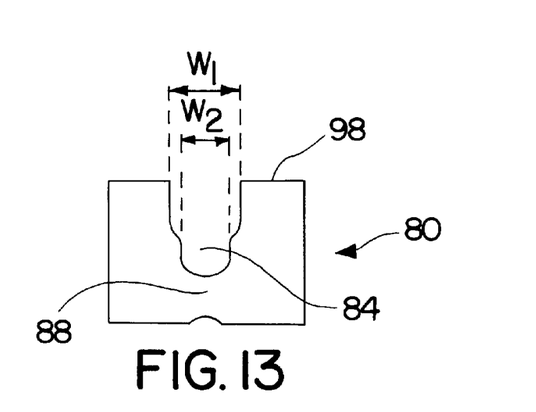
FIG. 13 is an end view, partly in schematic, of the fiber optic cable shield connector enclosure tub of FIG. 11.

FIG. 13 illustrates an end view of the fiber optic shield connector enclosure tub 80. Rounded notches 84 in the inner 90 and outer 88 end walls are substantially identical to cover notches 74. Notches 84 have a first width $W_1$ at their respective wall edge 98, 100 and taper to a second width $W_2$ as the notch 84 approaches the closed bottom 82 of the tub 80. Tub rounded notches 84 are aligned with cover rounded notches 74 so that when the enclosure is assembled, an opening 102 passes through the length of the enclosure.

Figure 14:
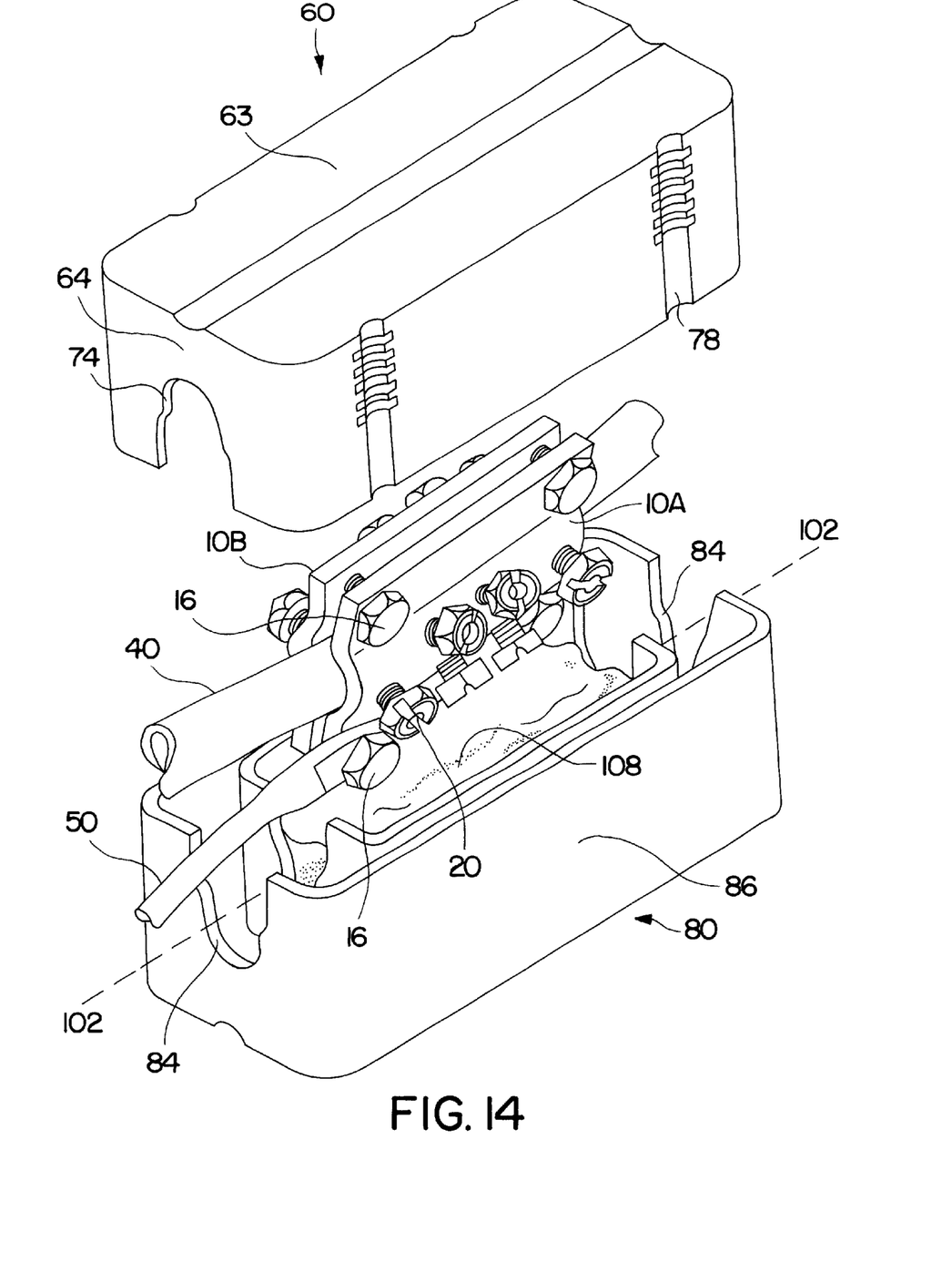
FIG. 14 is a partially exploded perspective view of the fiber optic shield connector/fiber optic cable/ground lead assembly of FIG. 5 in functional conjunction with the enclosure of FIG. 7.

FIG. 14 illustrates the fiber optic cable/shield connector/ground lead assembly of FIG. 5 functionally positioned for assembly within an enclosure formed from an enclosure tub 80 and cover 60. Tub central space 104 is illustrated partially filled with water repellant gel 108. In a preferred embodiment both the tub central space 104 and the cover central space 76 are partially filled with water repellant gel prior to assembly. The assembled fiber optic cable, shield connector and ground lead are positioned longitudinally in the cradle formed by tub inner side 92 and inner end 90 walls with the fiber optic cable 40 and ground lead 50 passing out of the enclosure through the rounded notches 84.

The enclosure cover 60 is aligned with the enclosure tub 80 and pushed together by hand into mating position with the enclosure tub 80. In a preferred embodiment, as the volume of the central spaces 76, 104 within the enclosure is reduced by manual pressure, excess gel is forced around the fiber optic cable 40 and ground lead 50 where they pass through the aligned notches 74, 84 to seal the interior space and form a water-tight, sealed enclosure surrounding the assembled fiber optic cable, shield connector and ground lead. In an assembled configuration the enclosure tub protrusions 106 snap into the transverse detents 79 in the cover rounded grooves 78 and retain the cover 60 in a compressed and mated position with the enclosure tub 80.

The assembly including the fiber optic cable, shield connector, ground lead and enclosure according to the present invention forms a durable, highly weather resistant, reliable ground connection. The assembly is easily implemented by craft personnel with a minimum of training and requiring no special tools. Reliable, multi-point electrical contact with the fiber optic cable shield is created without a significant disruption of the cable jacket, thus minimizing risk of damage to fiber optic cable conductors or linear strength members.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fiber optic shield connector comprising:
   a clamp constructed of conductive material defining an open ended, generally cylindrical cavity for receiving a fiber optic cable, said clamp having at least one threaded opening; and
   a grounding screw threadable with said threaded opening and including a driving head, a threaded shank axially extending from said head and terminating in a sharpened hollow point having a deep axial recess in the shank surrounded by a cutting edge which forms the extreme distal tip of said grounding screw,
   wherein said shank is axially dimensioned to allow said shank to protrude a pre-determined distance into said receiving cavity.

2. The fiber optic shield connector of claim 1, wherein said clamp comprises two cooperative substantially similarly shaped sections, each section including a central trough which partially defines said cavity and a pair of linear flanges, each of which transversely integrally extends from a longitudinal edge on each side of said trough.

3. The fiber optic shield connector of claim 2, wherein each said trough includes an arcuate surface and a plurality of longitudinally and angularly spaced threaded openings disposed in said arcuate surface.

4. The fiber optic shield connector of claim 3, wherein said trough has a longitudinal axis and said threaded openings are arranged so that the cutting tips of grounding screws received therein protrude into said cavity from at least two angular relationships to said axis.

5. The fiber optic shield connector of claim 2, wherein said flanges are secured to one another in surface-to-surface relationship and said connector further comprises means for fastening said flanges together.

6. An enclosure for receiving a fiber optic cable and shield connector assembly, said enclosure comprising:
   a box-like tub constructed of non-conductive material including end walls having notches disposed therein; and
   a box-like cover constructed of non-conductive material including end walls having notches disposed therein,
   wherein said cover fits closely within said tub, said cover end wall notches aligning with said tub end wall notches, whereby a housing is formed having an unobstructed longitudinal opening allowing said cable to pass through said housing.

7. The enclosure of claim 6, wherein said tub and said cover comprise side walls and said tub side walls include inward facing protrusions and said cover side walls include outward facing grooves being alignable with said protrusions when said cover is fit within said tub, whereby said protrusions are engageable in said grooves.

8. The enclosure of claim 7, wherein said grooves include transverse detents engageable by said protrusions, whereby said cover is retained within said tub.

9. The enclosure of claim 6, wherein said tub is a molded, unitary structure and said cover is a molded, unitary structure.

10. The enclosure of claim 6, wherein said tub includes a cradle within and in spaced relationship to said tub, said cradle having notches aligned with said tub end wall notches to form an unobstructed longitudinal opening traversing said tub.

11. The enclosure of claim 6, wherein said cover includes inner end walls in spaced relationship to said cover end walls, said inner end walls having notches aligned with said cover end wall notches to form an unobstructed longitudinal opening traversing said cover.

12. The enclosure of claim 6, wherein said tub and said cover notches comprise an open end and are substantially identical in their dimensions, each notch having a bifurcated width, including a first width at said notch open end and tapering to a second width as said notch progresses away from said open end.

13. A fiber optic shield connector and enclosure assembly comprising:
   a fiber optic cable having at least one fiber optic conductor, an outer jacket and a conductive shield intermediate said conductor and said jacket;
   a fiber optic shield connector comprising a clamp constructed of conductive material defining a cavity for receiving a fiber optic cable, said clamp having at least one threaded opening and a grounding screw threadable with said threaded opening and including a driving head, a threaded shank axially extending from said head and terminating in a sharpened hollow point, wherein said shank is axially dimensioned to allow said shank to protrude into said cavity,
   a ground lead capable of establishing a conductive path from said shield connector to a location remote from said shield connector; and
   a fiber optic cable shield connector enclosure comprising a box-like tub constructed of non-conductive material including end walls having notches disposed therein and a box-like cover constructed of non-conductive material including end walls having notches disposed therein,
   wherein said ground lead is conductively fixed to said shield connector and said cable is admitted in said clamp cavity and said grounding screw is tightened, penetrating said jacket and establishing electrically conductive contact between said shield and said connector, said assembled fiber optic cable and shield connector being placed within said tub with the cable and ground lead aligned with and resting in said tub end wall notches, said cover fit within said tub and said cover is pushed toward said tub.

14. The fiber optic shield connector and enclosure assembly of claim 13, wherein said tub and said cover are at least partially filled with a water repellent gel.

* * * * *